Oct. 14, 1969  D. M. TENNISWOOD  3,472,093
COLLAPSIBLE STEERING SHAFT COUPLING FOR A MOTOR VEHICLE
Filed Nov. 16, 1967  2 Sheets-Sheet 1
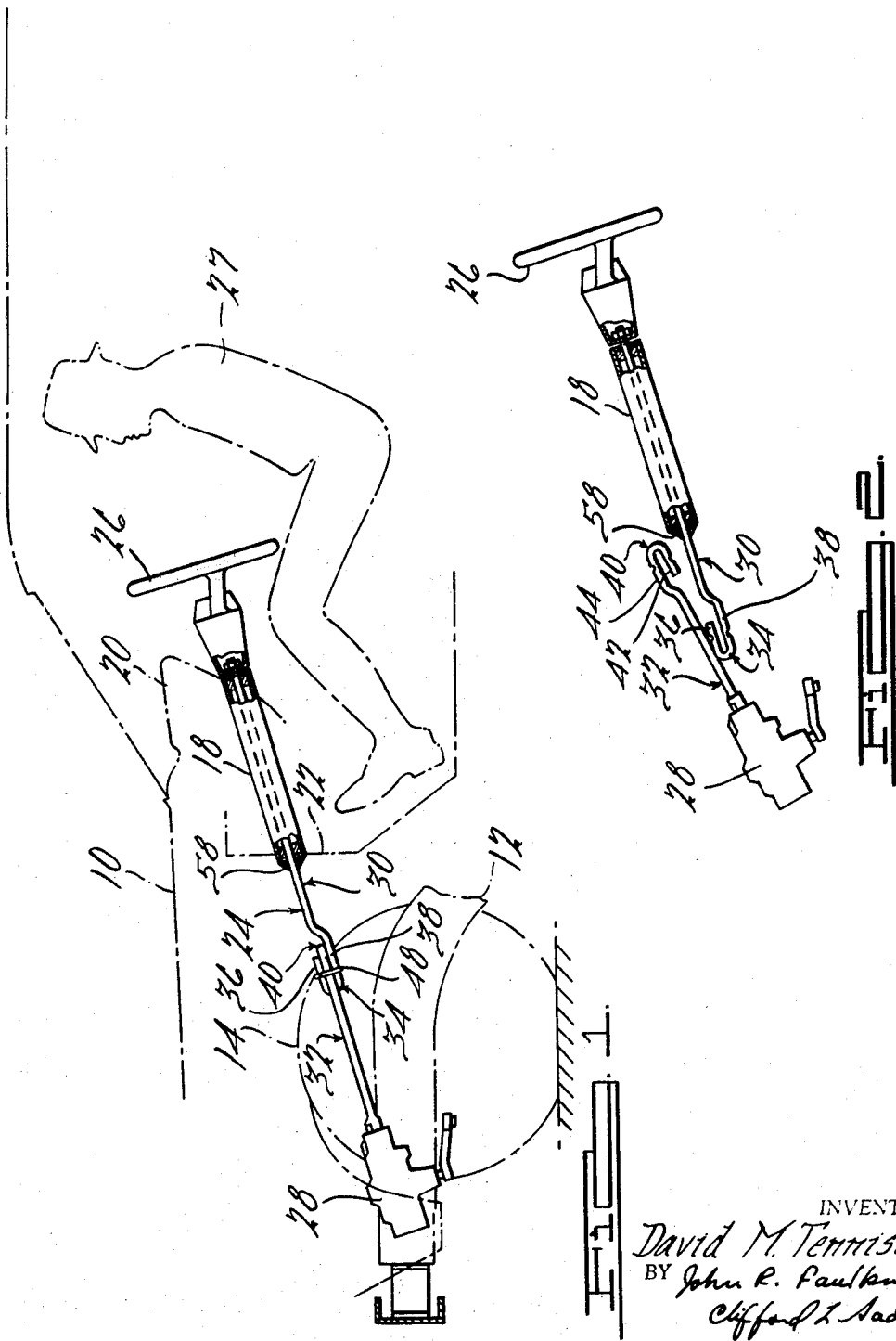
INVENTOR.
David M. Tenniswood.
BY John R. Faulkner
Clifford L. Sadler
ATTORNEYS Oct. 14, 1969     D. M. TENNISWOOD     3,472,093
COLLAPSIBLE STEERING SHAFT COUPLING FOR A MOTOR VEHICLE
Filed Nov. 16, 1967     2 Sheets-Sheet 2
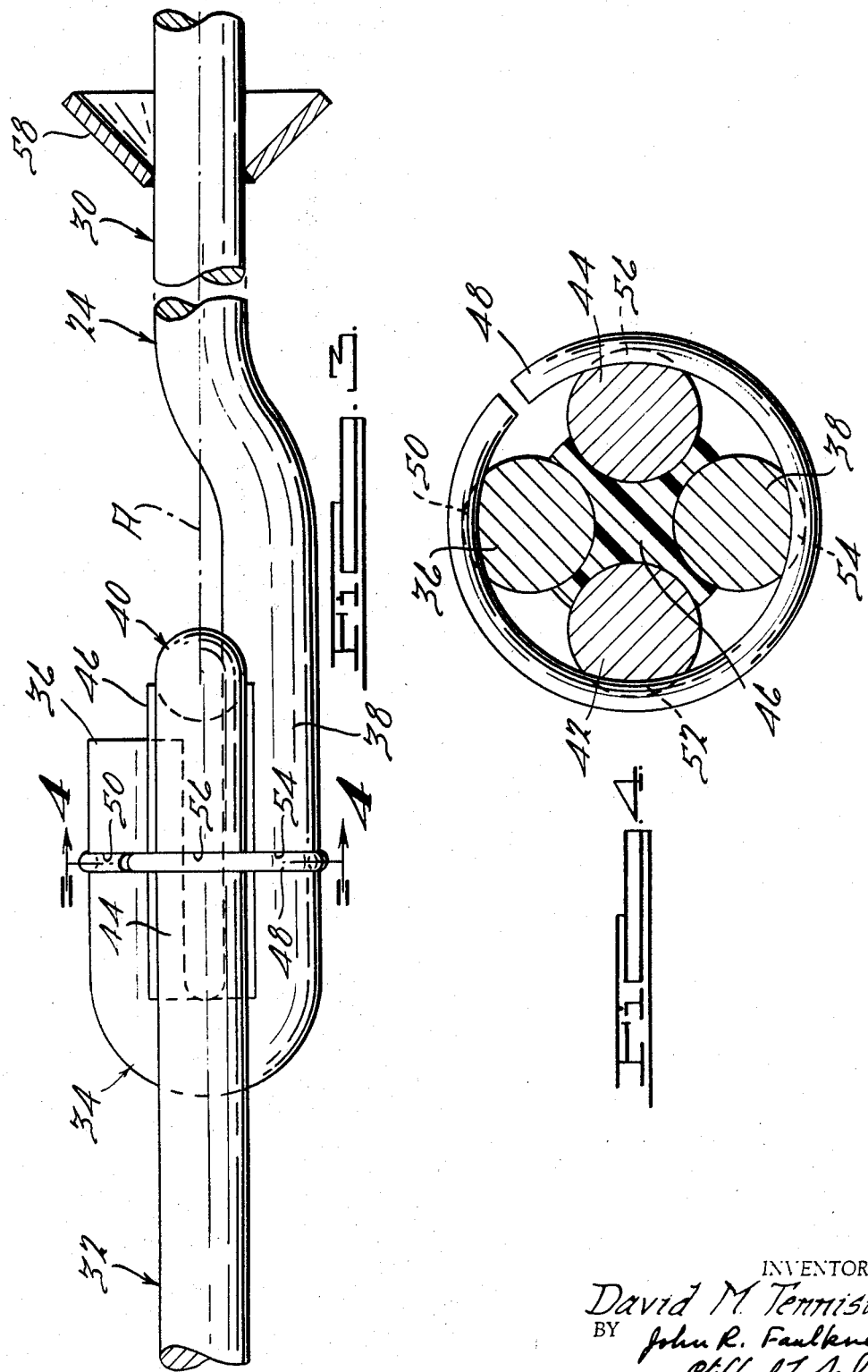
INVENTOR.
David M. Tenniswo.
BY John R. Faulkner
Clifford L. Sadler
ATTORNEYS United States Patent Office 3,472,093
Patented Oct. 14, 1969

3,472,093
COLLAPSIBLE STEERING SHAFT COUPLING FOR A MOTOR VEHICLE
David M. Tenniswood, Troy, Mich., assignor to Ford Motor Company, Dearborn, Mich., a corporation of Delaware
Filed Nov. 16, 1967, Ser. No. 683,511
Int. Cl. B62d 1/16
U.S. Cl. 74—492      11 Claims

ABSTRACT OF THE DISCLOSURE

A steering system for a motor vehicle having a two-piece steering shaft with one end connected to the steering gear and the other end connected to the steering wheel. The two shaft pieces are provided with hook-shaped or U-shaped end portions that overlap and interlock to form a torque transmitting coupling. A snap ring surrounds the interlocking end portions and maintains them in position. In the event the steering gear is displaced rearwardly, the snap ring will be displaced and the shaft pieces will disengage thereby preventing the upper shaft piece from being forced rearwardly.

BACKGROUND OF THE INVENTION

This invention relates to a motor vehicle steering system and more particularly, it relates to a steering system in which the steering shaft is allowed to collapse and prevent rearward displacement of the steering shaft.

Collapsible steering shafts for motor vehicles are well known and are extensively used on current model automobiles. These steering columns generally employ telescopic parts which allow only a limited amount of axial deformation.

This invention makes possible large amounts of axial travel of the steering gear without causing a corresponding amount of displacement of the rearward portion of the steering shaft.

BRIEF SUMMARY OF THE INVENTION

In the presently preferred embodiment of this invention, a motor vehicle is provided with a steering system having a two-piece steering shaft. The upper piece is connected to the steering wheel and the lower piece is connected to the steering gear. The two pieces having U-shaped or hooked end portions that interconnect and overlap to form a torque transmitting drive connection. A metallic snap ring surrounds the interconnected end portions to hold them in place. The connection is located forwardly of the fire wall of the vehicle.

If the steering gear is displaced rearwardly, an axial load will be exerted on the connection between the two shaft pieces. When that load exceeds a preset minimum, the snap ring will be displaced and the shaft pieces will be disconnected. This structure permits the steering gear to move rearwardly without exerting an axial load on the upper steering shaft that might cause its displacement.

BRIEF DESCRIPTION OF THE DRAWINGS

The many objects and advantages of a steering system constructed in accordance with the present invention will become apparent upon consideration of the following description and the accompanying drawings in which:

FIGURE 1 is a side elevational view, partly in section, of a motor vehicle incorporating a steering system of this invention;

FIGURE 2 is a side elevational view of the steering column structure illustrated in FIGURE 1 with the various elements shown displaced from their normal position;

FIGURE 3 is an enlarged elevational view of the steering shaft and interconnected between the shaft pieces, and;

FIGURE 4 is a sectional view taken along section lines 4—4 of FIGURE 3.

DETAILED DESCRIPTION OF THE INVENTION

Referring now to the drawings for a detailed description of this invention, wherein its presently preferred embodiment is illustrated, FIGURE 1 discloses a portion of a motor vehicle body 10 outlined in dot-dash lines. The body 10 is supported on a chassis frame 12. The chassis frame, in turn, is supported on the ground by road wheels 14.

A steering column 18 is supported on the instrument panel 20 at its upper end and on the fire wall 22 at its lower end. The column 18 rotatably supports a two-piece steering shaft assembly 24. A steering wheel 26 is connected to the upper end of the shaft assembly 24 in a position convenient to the vehicle operator 27. The lower end of the shaft assembly 24 is connected to the steering gear 28. The gear 28 is mounted on the frame 12 and is constructed to be connected to the steering linkage for the front wheels 16.

Referring to FIGURE 3, the steering shaft assembly 24 comprises upper and lower shaft pieces 30 and 32. The upper shaft piece 30 is provided with a U-shape end portion 34 that is formed with parallel leg portions 36 and 38. As shown in FIGURE 3, the leg portion 38 is offset from the axis of rotation "A" of the shaft assembly 24. Leg portion 36 is disposed on the opposite side of the axis "A" by an equal amount.

The lower shaft piece 32 has an end portion 40 of U-shaped configuration identical to the end portion 34 of the shaft piece 30. As disclosed in FIGURE 4, the end portion 40 is formed with leg portions 42 and 44 so that the two shaft piecees 30, 32 may have their end portions 34, 40 overlapping and interconnecting in the manner illustrated. By arranging the end portions 34 and 40 ninety degrees out of phase, the ends 34 and 40 neatly nest together.

A nonmetallic plastic or rubber block 46 is interposed between the end portions 34, 40. The block 46 has longitudinal ribs that extend in a radial direction so as to be interposed between the legs 36, 38, 42 and 44. The block 46 serves to prevent rattling caused by metal to metal contact and, in addition, to isolate noise and vibration originating in the chassis from being transmitted to the passenger compartment.

The interconnected ends of the shaft pieces 30, 32 are held in axial position by a large snap ring 48. Appropriate notches 50, 52, 54 and 56 are provided on the leg portions 36, 42, 38 and 44, respectively. These notches form a seat for the snap ring 48.

A reaction ring 58 is welded to the upper shaft piece 30 and is situated adjacent the lower end of the steering column 18 as shown in FIGURE 1.

OPERATION

The interconnected end portions 34 and 40 of the shaft pieces 30 and 32, in cooperation with the nonmetallic element 46, form a driving connection for transmitting steering torque gear 28. These components maintain their relative relationship as illustrated in FIGURES 1, 3 and 4.

In the event the steering gear 28 is displaced rearwardly above a preset minimum value, the axial load on the interconnection between the end portions 34 and 40 will cause the snap ring 48 to become disengaged from the notches 50, 52, 54 and 56. The interconnected ends 34 and 40 will then separate in the manner illustrated in FIGURE 2. The reaction ring 58 engages the lower end of the steering column 18 to prevent the upper shaft section 30 from being pushed rearwardly and allow the ends 34 and 40 to separate.

It is readily apparent that with this structure steering gear 28 and lower portion 32 of the shaft assembly 24 may be forced rearwardly without moving the steering shaft rearwardly.

The foregoing description presents the presently preferred embodiment of this invention. Modifications and alterations may occur to those skilled in the art that will come within the scope and spirit of the invention.

I claim:

1. A steering mechanism for a motor vehicle comprising vehicle support structure, a steering gear mounted forwardly on said structure and constructed to be connected to a steering linkage, a steering column connected to said support structure, a steering shaft assembly rotatably supported by said column, said shaft assembly being connected to a steering wheel at its rearward end and to said steering gear at its forward end, said shaft assembly comprising first and second interconnected steering shaft pieces, said first shaft piece having an end portion with a pair of side-by-side legs, said second shaft piece having an end portion with a pair of side-by-side legs, said end portion of said first shaft piece being in interlocking overlapping relationship to said end portion of said second shaft piece, said interlocking end portions being constructed to permit said end portions to become disengaged when a rearwardly directed force is applied to said second shaft piece, a resilient ring surrounding said end portions, said ring being constructed to hold said legs in interlocking relationship and to become displaced therefrom when a rearward force is applied to said second shaft piece to thereby permit said end portions to become disengaged.

2. A steering mechanism for a motor vehicle as defined in claim 1 and including:
a nonmetallic resilient bearing element interposed between said end portions.

3. A steering mechanism for a motor vehicle as defined in claim 1 and including:
said legs all being arranged parallel to the axis of rotation of said steering shaft assembly, a nonmetallic resilient bearing element interposed between said end portions.

4. A steering mechanism for a motor vehicle as defined in claim 1 and including:
each of said legs having an exposed notch, said ring being seated in said notches, said ring being constructed to become displaced from said notches when a rearward force is applied to said second shaft piece to thereby permit said end portions to become disengaged.

5. A steering mechanism for a motor vehicle comprising vehicle support structure, a steering gear mounted forwardly on said structure and constructed to be connected to a steering linkage, a steering column connected to said support structure, a steering shaft assembly rotatably supported by said column, said shaft assembly being connected to a steering wheel at its rearward end and to said steering gear at its forward end, said shaft assembly comprising first and second interconnected steering shaft pieces, said first shaft piece having an end portion with a pair of side-by-side legs, said second shaft piece having an end portion with a pair of side-by-side legs, said end portion of said first shaft piece being in interlocking overlapping relationship to said end portion of said second shaft piece, said interlocking end portions being constructed to permit said end portions to become disengaged when a rearwardly directed force is applied to said second shaft piece, a nonmetallic resilient bearing element interposed between said end portions.

6. A steering mechanism for a motor vehicle as defined in claim 5 and including:
said element having ridges interposed between the legs of said end portions.

7. A steering mechanism for a motor vehicle comprising vehicle support structure, a steering gear mounted forwardly on said structure and constructed to be connected to a steering linkage, a steering column connected to said support structure, a steering shaft assembly rotatably supported by said column, said shaft assembly being connected to a steering wheel at its rearward end and to said steering gear at its forward end, said shaft assembly comprising first and second interconnected steering shaft pieces, said first shaft piece having an end portion with a pair of side-by-side legs, said second shaft piece having an end portion with a pair of side-by-side legs, said end portion of said first shaft piece being in interlocking overlapping relationship to said end portion of said second shaft piece, said interlocking end portions being constructed to permit said end portions to become disengaged when a rearwardly directed force is applied to said second shaft piece, said end portion of said first shaft piece having a generally U-shape with said pair of legs being disposed parallel to and equally spaced from the axis of rotation of said first shaft piece, said end portion of said second shaft piece having a generally U-shape with said pair of legs being disposed parallel to and equally spaced from the axis of rotation of said second shaft piece, a nonmetallic resilient bearing element interposed between said end portions, said element having four equally spaced axially extending ridges interposed between the legs of said U-shape portions, a resilient ring surrounding said end portions, each of said legs having exposed notch, said ring being seated in said notches, means connected to said first shaft piece and constructed to prevent rearward displacement of said first shaft piece relative to said support structure, said ring being constructed to become displaced from said notches when a rearward force is applied to said second shaft piece to thereby permit said end portions to become disengaged.

8. A steering mechanism for a motor vehicle comprising vehicle support structure, a steering gear mounted forwardly on said structure and constructed to be connected to a steering linkage, a steering column connected to said support structure, a steering shaft assembly rotatably supported by said column, said shaft assembly being connected to a steering wheel at its rearward end and to said steering gear at its forward end, said shaft assembly comprising first and second interconnected steering shaft pieces, said first shaft piece having an end portion with a pair of side-by-side legs, said second shaft piece having an end portion with a pair of side-by-side legs, said end portion of said first shaft piece being in interlocking overlapping relationship to said end portion of said second shaft piece, said interlocking end portions being constructed to permit said end portions to become disengaged when a rearwardly directed force is applied to said second shaft piece, said end portion of said first shaft piece having a generally hook-shape with said pair of legs being disposed parallel to and equally spaced from the axis of rotation of said first shaft piece, said end portion of said second shaft piece having a generally hook-shape with said pair of legs being disposed parallel to and equally spaced from the axis of rotation of said second shaft piece.

9. A steering mechanism for a motor vehicle comprising vehicle support structure, a steering gear mounted forwardly on said structure and constructed to be connected to a steering linkage, a steering column connected to said support structure, a steering shaft asembly rotatably supported by said column, said shaft assembly being connected to a steering wheel at its rearward end and to said steering gear at its forward end, said shaft assembly comprising first and second interconnected steering shaft pieces, said first shaft piece having an end portion with a pair of side-by-side legs, said second shaft piece having an end portion with a pair of side-by-side legs, said end portion of said first shaft piece being in interlocking overlapping relationship to said end portion of said second shaft piece, said interlocking end portions being constructed to permit said end portions to become disengaged when a rearwardly directed force is applied to said second shaft piece, a resilient means engaging said end portions, said resilient means being constructed to hold said legs in interlocking relationship and to become displaced therefrom when a rearward force above a pre-established minimum is applied to said second shaft piece to thereby permit said end portions to become disengaged.

10. A steering mechanism for a motor vehicle as defined in claim 9 and including:

said legs all being arranged parallel to the axis of rotation of said steering shaft assembly.

11. A steering mechanism for a motor vehicle comprising vehicle support structure, a steering gear mounted forwardly on said structure and constructed to be connected to a steering linkage, a steering column to said support structure, a steering shaft assembly rotatably supported by said column, said shaft assembly being connected to a steering wheel at its rearward end and to said steering gear at its forward end, said shaft assembly comprising first and second interconnected steering shaft pieces, said first shaft piece and said second shaft piece having complementary end portions constructed to interfit in interlocking overlapping relationship, said interlocking end portions being constructed to transmit steering torque from said first shaft piece to said second shaft piece, said interlocking end portions being constructed to permit said end portions to become disengaged when a rearwardly directed force is applied to said second shaft piece, resilient means engaging said end portions and constructed to hold said end portions in interlocking relationship and to become displaced from said end portions when a rearward force above a pre-established minimum is applied to said second shaft piece to thereby permit said end portions to become disengaged.

References Cited

UNITED STATES PATENTS

| 2,548,244 | 4/1951 | Stein | 74—492 |
| 3,329,040 | 7/1967 | Stein | 74—493 |
| 3,401,576 | 9/1968 | Eckels | 74—493 |

MILTON KAUFMAN, Primary Examiner

U.S. Cl. X.R.

180—78; 280—82